United States Patent Office 3,836,565
Patented Sept. 17, 1974

3,836,565
STABILIZED ADHESIVE COMPOSITIONS
Bernd Brinkmann, Bad Zwischenahn, Germany, assignor to Schering AG, Berlin and Bergkamen, Germany
No Drawing. Filed May 31, 1973, Ser. No. 365,796
Claims priority, application Germany, June 10, 1972, P 22 28 379.0
Int. Cl. C07c 121/30, 121/48, 121/70
U.S. Cl. 260—464                                12 Claims

ABSTRACT OF THE DISCLOSURE

Stabilized adhesive compositions comprising an easily anionically polymerizable olefinic monomer of the formula

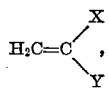

where X and Y are —CN or —COOR and a stabilizer which is:

(1) a trialkyl oxonium salt,

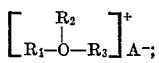

(2) a carboxonium or sulfonium salt

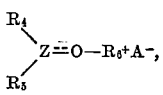

where Z is carbon or sulfur; or (3) a phosphonium salt

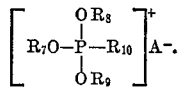

---

The present invention relates to stabilized adhesive compositions and to methods for making the same.

More in particular, the present invention relates to stabilized adhesive compositions comprising a monomeric substituted olefin of the formula

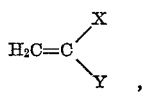

wherein X and Y are the same or different and are —CN —COOR, where R is phenyl, cycloalkyl having 5 to 7 carbon atoms, or alkyl or alkenyl having 1 to 20 carbon atoms, preferably 1 to 12 carbon atoms, which may contain at least one oxygen atom in the carbon chain thereof. Compounds of this type wherein R is alkyl or alkenyl having 1–6 carbon atoms are particularly accessible.

For example, said stabilized adhesives may comprise one or more monomeric esters of α-cyanacrylic acid of the formula

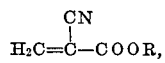

where R has its earlier meaning.

Monomers of this type are exceptionally reactive adhesives which are easily anionically polymerizable, i.e. they even polymerize extraordinarily rapidly in the presence of small amounts of weak Lewis bases such as alcohols, enolizable ketones, or water. The latter is ordinarily present as moisture on all surfaces and application of the monomers in question to such surfaces permits the formation of solid joints therebetween.

However, to combat premature polymerization, particularly during working up and storage, stabilizers must be added to the monomeric olefins. Heretofore, acid compounds, particularly acid gases such as sulfur dioxide and nitrogen monoxide, have been employed (cf. U.S. 2,765,-332 and U.S. 2,794,788), or materials such as boron trifluoride and sulfur trioxide. Further, the use of acids such as picric acid (cf. DOS 1,900,990) or sulfonic acid (DOS 2,042,334) as a stabilizer is known in the art. All of these acid substances have the disadvantage that they negatively influence the rate of adhesion of the adhesive.

The use of sulfur dioxide is best known. In this case, however, dosage of the stabilizer is a considerable problem since overdosage leads to a worsening of the adhesion rate, whereas underdosage leads to a worsening of the storability.

A further disadvantage is the high volatility of the known gaseous acid stabilizers: their volatility can easily lead to a change in the original concentration of the stabilizers in the adhesive.

Another class of compounds also suitable for stabilization, and which compounds avoid the aforementioned disadvantages, are the sultones described in DOS 1,807,895. However, the use of these compounds is not unobjectionable because the sultones are known to be carcinogenic. In particular, 1,3-propane sultone is one of the strongest potential carcinogens among the alkylating agents [cf. H. Druckery et al., Z. Krebsforsch. 75, 69–84 (1970)].

The sulfonic acids, also proposed as stabilizers, for example in DOS 2,042,334, show the great disadvantage that they strongly decrease the adhesion rate of adhesives stabilized therewith.

According to one embodiment of the present invention, adhesive compositions containing olefins of the type described are stabilized by the presence therein of a stabilizingly-effective amount of a dissolved oxonium compound of the formula

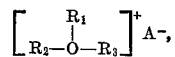

in which $R_1$, $R_2$, and $R_3$ are the same or different alkyl groups having 1–10 carbon atoms, preferably 1–4 carbon atoms, and wherein A is the anion of a very strong acid, particularly the $BF_4^-$ or $SbCl_6^-$ anion.

In another embodiment of the invention, adhesive compositions are stabilized with a dissolved carboxonium compound of the formula

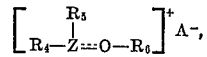

wherein A has its earlier meaning; Z is carbon or sulfur; $R_6$ is alkyl or alkenyl preferably having 1–4 carbon atoms; and $R_4$ and $R_5$, taken alone, are alkyl, alkenyl, or alkoxy, each preferably having 1–4 carbon atoms. When Z is a carbon atom, $R_4$ and $R_5$, taken together with the carbon atom Z, may form a 1,7,7-trimethylnorcamphane, pyrylium, or benzopyrylium group. This embodiment encompasses the use of compounds such as ethoxy dimethyl sulfonium tetrafluoborate as a stabilizer, for example.

A still further embodiment of the stabilized adhesive compositions of the invention encompasses adhesives which contain, instead of oxonium compounds, phosphonium compounds of the formula

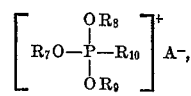

in which $R_7$, $R_8$, and $R_9$ are the same or different alkyl, preferably having 1–4 carbon atoms, and in which $R_{10}$ is alkyl having 1–10 carbon atoms, preferably 1–4 carbon atoms. Once again, A⁻ has its earlier meaning. These phosphonium compounds can be obtained by a reaction of the earlier-mentioned oxonium compounds of the formula

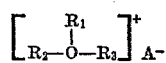

with a compound of the formula

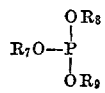

wherein $R_1$, $R_2$, $R_3$ ($=R_{10}$) $R_7$, $R_8$, and $R_9$ have their earlier meanings. Such compounds and reactions are disclosed by Dimroth et al., Chemische Berichte 93, 1649–1658 (1960), incorporated herein by reference.

In the aforementioned adhesive compositions, the stabilizing compound is preferably present in an amount between 0.005 and 5 percent by weight of the monomeric olefin component. The stabilized adhesives may also additionally comprise, alone or in combination, an inhibitor of free radical polymerization, a thickening agent, a plasticizer, and unsaturated monomers which are or are not copolymerizable with said olefins. Suitable agents of these types are known in the art.

In contrast to the stabilizers known in the prior art, the stabilizers of the present invention are solid substances which can be easily added in proper dosages and which, at appropriate concentrations, have no disadvantageous effect on the adhesion rate of the monomeric olefins, e.g. of cyanacrylates.

Their particular advantage is, further, that because of their salt character, the stabilizers of the present invention have negligible vapor pressure and therefore do not reach potentially dangerous concentrations in the ambient atmosphere even at elevated temperatures.

Cyanacrylic acid esters particularly useful as the adhesive component of the adhesive compositions of the present invention can be prepared by conventional methods, for example those taught in U.S. Pat. 2,467,927. According to the process of this patent, the corresponding esters of cyanacetic acid are reacted with formaldehyde in the presence of basic catalysts to form polymeric condensation products. After removal of the water of reaction and the solvent, the condensation products are thermally decomposed in the presence of a free radical stabilizer and of phosphorus pentoxide. The monomers, which are distilled off under reduced pressure, are advantageously combined with a stabilizer according to the present invention and may then, optionally, be fractionated.

The oxonium compounds used as stabilizers according to the present invention are a class of easily-accessible compounds. Their preparation is described in detail, for example, in Houben-Weyl, "Methoden der organischen Chemie," 4th Edition, Vol. 6/3, page 329 et seq. for example, tertiary oxonium compounds of the kind described above can be prepared by (1) the reaction of metallic and non-metallic halogen-etherates with epoxy compounds; (2) the condensation of alkyl halides with metallic or non-metallic halogen-etherates; (3) the alkylolation of ethers with alkyl halides and silver fluoborate; (4) the reaction of aliphatic diazo compounds with primary and secondary oxonium salts; (5) an exchange of alkyl groups between aliphatic ethers in the presence of other trialkyloxonium salts; and (6) by a number of other more specialized techniques described in detail in Houben-Weyl, op. cit.

It is common to these compounds that the oxygen atom has a positive charge. Typical representatives of this class of compounds are, for example, triethyloxonium fluoborate, trimethyloxonium fluoborate, triethyloxonium hexachloroantimonate, and triethyloxonium - (2,4,6-trinitro-benzene-sulfonate).

As further disclosed in Houben-Weyl, op. cit., carboxonium or sulfonium salts of the formula

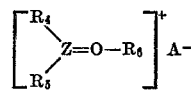

given earlier herein can be obtained by the alkylation of carbonyl compounds such as ketones, lactones, pyrones, and esters with a trialkyl oxonium salt, e.g. a triethyloxonium salt. Ethoxy-dimethyl sulfonium tetrafluoborate can be prepared by the reaction of dimethyl sulfoxide with triethyl oxonium tetrafluoborate, for example. Carbonyl compounds may also be alkylated with alkyl halides and dry silver fluoborate. In another synthesis, boron trifluoride or antimony (V) chloride is reacted with acetals and ortho acid esters.

Typical representative of this group include: O-ethyl-camphor-oxonium fluoborate; ethoxy-tropylium fluoborate; 2,3-benzo-5-ethoxy-pyrylium fluoborate; O-ethyl-dibenzal-acetonium fluoborate; and triethyl carbonate-acidium fluoborate. A variety of di- and tri-alkyl oxonium salts falling within the scope of the present invention, and their preparation, are disclosed by H. Meerwein et al. in Ann. f. Chemie 632, 38–55 (1960), incorporated herein by reference, for example: diethoxy- and diethoxy ethyl-carbonium fluoborates and hexachlorantimonates; diethoxy methyl carbonium hexachlorantimonate; and trimethoxy- and triethoxy-carbonium fluoborates.

Triethoxy ethyl phosphonium fluoborate can be mentioned as a particularly useful phosphonium stabilizer. This compound is obtained by the reaction of triethyl phosphite with triethyl oxonium fluoborate (cf. Dimroth et al., op. cit.).

As mentioned earlier, in addition to these stabilizers, which hinder anionic polymerization, known inhibitors for polymerization proceeding by a free radical mechanism can also be present in the adhesive combinations. The presence of such additional stabilizers, while not necessary, is advantageous if the adhesives are exposed to conditions promoting free-radical polymerization, e.g. heat, light, or traces of metals. If present, the stabilizers are suitable included in an amount between 0.01 and 1.0 percent by weight of the olefin. For this purpose, compounds such as hydroquinone, thymoquinone, and similar materials can be employed.

If desirable, thickening agents can be added to the adhesives to obtain a higher viscosity. Such thickeners include, for example, polymethylmethacrylate, polycyanacrylic acid esters, polyacrylic acid methyl ester, polyvinyl acetate, polyvinyl ether, and cellulose esters.

Further, known plasticizers such as dioctyl phthalate, tricresyl phosphate, diallyl phthalate, succinic acid dimethyl ester, sebacic acid dimethyl ester, and the like can be added to advantage, if desired.

Finally, other unsaturated compounds can optionally be added to the adhesives, which materials may or may not be capable of copolymerization with the aforementioned olefins.

A better understanding of the present invention and of its many advantages will be had by referring to the following specific examples given by way of illustration.

EXAMPLE 1

Triethyloxonium fluoborate

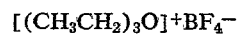

is prepared from boron trifluoride etherate and epichlorohydrin, for example as shown on page 336 of Houben-Weyl, op. cit.

Freshly-prepared α-cyanacrylic acid methyl ester is combined with 0.05 percent by weight of this stabilizer as well as with 0.01 percent by weight of hydroquinone.

The adhesive composition prepared in this fashion shows no change in its consistency after 60 days storage at 50° C.

If one end of a cut ring of buna-N-rubber is joined to the other cut end of the ring which has been coated with a film of this adhesive, a solid joinder of the ends is obtained after a few seconds.

EXAMPLE 2

Triethyloxonium-hexachloroantimonate of the formula

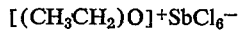
$$[(CH_3CH_2)O]^+SbCl_6^-$$

is prepared from orthoformic acid-triethyl ester, diethyl ether, and antimony pentachloride, for example as shown on on page 340 of Houben-Weyl, op. cit.

Freshly-prepared α-cyanacrylic acid methyl ester is combined with 0.01 percent of this compound as well as 0.01 percent by hydroquinone. The product shows no change in consistency on 90 days storage at 50° C.

EXAMPLE 3

Ethoxy-dimethyl-sulfonium-fluoborate of the formula

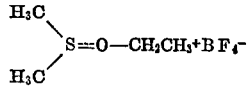

is prepared by the reaction of dimethyl sulfoxide with triethyl oxonium-fluoborate, for example as shown on page 360 of Houben-Weyl, op. cit.

Freshly-prepared α-cyanacrylic acid methyl ester is combined with 0.1 percent of this compound and 0.1 percent of hydroquinone. On joining two ends of a ring of buna-N-rubber with the aid of this adhesive, a solid joint is obtained after only a few seconds.

A summary of further properties is given in Table I below.

TABLE I

[Determination of suitable stabilizer concentration]

| Content by weight of ethoxy-dimethyl-sulfonium-fluoborate (percent) | Storage stability (days) | |
|---|---|---|
| | At room temperature (20–25° C.) | At 50° C. |
| 5.0 | >150 | |
| 2.0 | >150 | |
| 0.3 | >150 | 120 |
| 0.1 | >150 | 52 |
| 0.03 | >120 | 52 |
| 0.01 | 85 | 14 |
| 0.001 | 18 | |
| 0 | <1 | 1 |

NOTE.—There was no change in the color of the product at room temperature during the times given.

EXAMPLE 4

O-ethyl-camphor-fluoborate is prepared from triethyl oxonium fluoborate and camphor, for example as shown on page 349 of Houben-Weyl, op. cit. The material has the formula

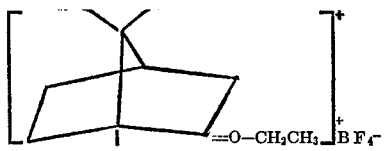

Freshly-prepared α-cyanacrylic acid methyl ester is combined with 0.1 percent of this compound and with 0.1 percent of hydroquinone. The mixture shows no change in consistency after 90 days storage at 50° C.

EXAMPLE 5

2-ethoxy-benzopyrylium fluoborate of the formula

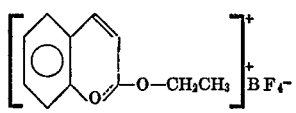

is prepared from cumarin and triethyloxonium-fluoborate, for example as shown on page 353 of Houben-Weyl, op. cit.

Freshly-prepared α-cyanacrylic acid methyl ester is combined with 0.1 percent of this stabilizer as well as with 0.1 percent of hydroquinone. The mixture shows no change in consistency after 90 days storage at 50° C.

EXAMPLE 6

Triethoxyethyl phosphonium-fluoborate of the formula

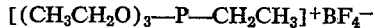
$$[(CH_3CH_2O)_3—P—CH_2CH_3]^+BF_4^-$$

is prepared by the reaction of triethyl phosphite with triethyl oxonium tetrafluoborate, for example as shown on page 1656 of the Dimroth et al. article mentioned earlier herein.

Portions of freshly-prepared cyanacrylic acid methyl ester are combined with 0.5, 0.3, 0.1, 0.05 and 0.01 percent of this stabilizer as well as with 0.1 percent of hydroquinone. In each case an adhesive is obtained whose consistency remains unchanged after 80 days' storage at 50° C. Solid joints are formed with this adhesive in buna-N-rubber rings in less than three seconds.

EXAMPLES 7–18

Table II below shows the stabilizing effect brought about in a number of adhesive compositions containing a cyanoacrylic acid ester

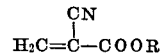

by the inclusion therein of ethoxy-dimethyl-sulfonium tetrafluoroborate (EDST) alone, by the inclusion of hydroquinone (HQ) alone as a free-radical polymerization stabilizer, and by the inclusion of both types of stabilizers.

TABLE II

| Ex. | R | Percent by weight | | At room temperature (20–25° C.) | At 50° C. |
|---|---|---|---|---|---|
| | | EDST | HQ | | |
| 7 | Ethyl | 0.06 | 0.1 | >1 year | 90 days. |
| 8 | Allyl | 0.06 | 0.1 | >6 months | |
| 9 | Phenyl | 0.06 | 0.1 | do | |
| 10 | Heptyl | 0.01 | 0.1 | do | |
| 11 | Lauryl | 0.01 | 0.1 | do | |
| 12 | Phenyl | 0.01 | 0.1 | do | |
| 13 | Butene-4-yl | 0.03 | 0.1 | do | |
| 14 | Ethyl | | 0.1 | 2 days | |
| 15 | Methyl | | | 1 day | |
| 16 | do | 0.06 | | >3 months | |
| 17 | Cyclohexyl | 0.03 | 0.1 | >6 months | |
| 18 | C₂H₄OCH₂CH=CH₂ | 0.01 | 0.1 | do | |

What is claimed is:
1. A compound of the formula

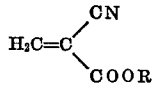

wherein R is phenyl, cycloalkyl having from 5–7 carbon atoms, or alkyl or alkenyl having 1–20 carbon atoms, stabilized with between 0.005 and 5 percent, by weight of said compound, of a member selected from the group consisting of:

(1) trialkyl oxonium compounds of the formula

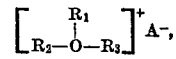

wherein $R_1$, $R_2$, and $R_3$ are the same or different alkyl groups having 1–10 carbon atoms and wherein $A^-$ is the fluoborate or hexachloroantimonate anion;

(2) carboxonium and sulfonium compounds of the formula

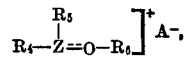

wherein A has its earlier meaning, Z is carbon or sulfur, $R_6$ is alkyl or alkenyl having 1–4 carbon atoms, and $R_4$ and $R_5$, taken alone, are alkyl, alkenyl, or alkoxy, each having 1–4 carbon atoms, or, when Z is carbon, $R_4$ and $R_5$, taken together with the carbon atom Z, form a 1,7,7-trimethyl-norcamphane, pyrylium, or benzopyrylium group; and (3) phosphonium compounds of the formula

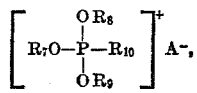

wherein $A^-$ has its earlier meaning and $R_7$, $R_8$, and $R_9$ are the same or different alkyl groups having 1–4 carbon atoms and $R_{10}$ is alkyl having 1–10 carbon atoms.

2. A compound as in Claim 1 which additionally comprises a stabilizer for free-radical polymerization.

3. A compound as in Claim 1 wherein said stabilizer is a trialkyl oxonium compound.

4. A compound as in Claim 3 wherein said stabilizer is trialkyloxonium tetrafluoborate.

5. A compound as in Claim 3 wherein said stabilizer is triethyloxonium hexachloroantimonate.

6. A compound as in Claim 1 wherein said stabilizer is a sulfonium compound.

7. A compound as in Claim 6 wherein said sulfonium compound is ethoxy-dimethyl sulfonium tetrafluoborate.

8. A compound as in Claim 1 wherein said stabilizer is a carboxonium compound.

9. A compound as in Claim 8 wherein said carboxonium compound is O-ethyl-camphor tetrafluoborate.

10. A compound as in Claim 8 wherein said carboxonium compound is 2-ethoxy-benzopyrylium tetrafluoborate.

11. A compound as in Claim 1 wherein said stabilizer is a phosphonium compound.

12. A compound as in Claim 11 wherein said phosphonium compound is triethoxy-ethyl-phosphonium tetrafluoborate.

References Cited

UNITED STATES PATENTS

| | | | |
|---|---|---|---|
| 2,784,215 | 3/1957 | Joyner | 260—465.4 |
| 3,355,482 | 11/1967 | Coover, Jr. et al. | 260—464 |
| 3,652,635 | 3/1972 | Kawamura et al. | 260—465.4 X |
| 3,742,018 | 6/1973 | O'Sullivan | 260—465.4 |

JOSEPH P. BRUST, Primary Examiner

U.S. Cl. X.R.

260—465 D, 465.4, 486